3,379,743
17-ENOL ESTERS OF 3-OXY-17-HYDROXY-POLY-
UNSATURATED STEROIDS AND PREPARATION
THEREOF
Andrew John Manson and Donald K. Phillips, North
Greenbush, N.Y., assignors to Sterling Drug Inc., New
York, N.Y., a corporation of Delaware
No Drawing. Filed June 7, 1965, Ser. No. 462,129
14 Claims. (Cl. 260—397.5)

ABSTRACT OF THE DISCLOSURE 17-enol esters of 3-oxy-17-hydroxy-polyunsaturated steroids, i.e., 3-alkoxy or -acyloxy-17-acyloxy-1,3,5(10), 16-estratetraenes having from one to three additional double bonds in positions selected from the 6,7-, 8,9- and 14,15-positions have hypocholesteremic and estrogenic activities. These enol esters, when higher than the acetate, are prepared by treating an oxo steroid with the appropriate acid halide in isopropenyl acetate solution in the presence of a strong acid.

This invention relates to new steroid compounds and to a novel process in the preparation of steroids. In particular, the invention is concerned with 17-enol esters of 3-oxy-polyunsaturated steroids, and with a process for preparing enol esters of oxo-steroids.

The new compounds of the invention are those of the general formula

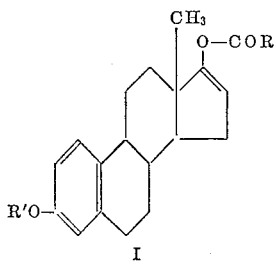

I having from one to three additional double bonds in positions selected from the 6,7-, 8,9- and 14,15-positions; wherein —COR is lower-carboxylic acyl having up to (and therefore including) twelve carbon atoms, and R' is lower-alkyl or lower-carboxylic acyl having up to (and therefore including) twelve carbon atoms.

The term lower-carboxylic acyl having up to (and therefore including) twelve carbon atoms refers to acyl radicals derived from carboxylic acids having up to (and therefore including) twelve carbon atoms and a molecular weight less than about 250. Representative of the lower-carboxylic acyl radicals which can be present are lower-alkanoyl, e.g., acetyl, propionyl, isobutyryl, caproyl, heptanoyl, octanoyl, dodecanoyl, trimethylacetyl, and the like; cycloalkyl-lower-alkanoyl wherein cycloalkyl has 5–6 ring members, e.g., β-cyclopentylpropionyl, β-cyclohexylpropionyl, and the like; benzoyl; phenyl-lower-alkanoyl or -alkenoyl, e.g., phenylacetyl, β-phenylpropionyl, cinnamoyl, and the like; phenoxy-lower-alkanoyl, e.g., p-chlorophenoxyacetyl; and pyridylcarbonyl, e.g., nicotinoyl and isonicotinoyl. In acyl radicals containing a phenyl group, the benzene ring thereof can be unsubstituted or substituted by any number and kind of substituents inert under the reaction conditions used, including lower-alkyl, for example p-tolyl; lower-alkoxy, for example 3,4-dimethoxyphenyl; halogen (including fluorine, chlorine, bromine and iodine), for example 2-bromophenyl; and nitro, for example p-nitrophenyl.

The lower-alkyl and lower-alkoxy groups can have from one to four carbon atoms.

R' in the above formula can represent lower-alkyl and as such stands for an alkyl group having from one to about six carbon atoms including methyl, ethyl, propyl, isopropyl, butyl, tertiary-butyl, amyl, hexyl and the like.

The compounds of the invention are prepared from the corresponding 17-oxo compounds of the formula

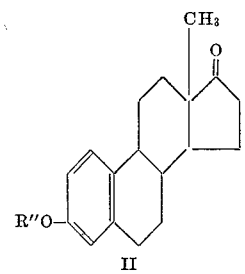

II having from one to three additional double bonds in positions selected from the 6,7-, 8-9- and 14,15-positions; wherein R" is hydrogen, lower-alkyl or lower-carboxylic acyl having up to twelve carbon atoms. The starting materials can be either optically-active forms derived from natural sources, or optically-inactive (racemic) forms derived by total synthesis.

The compounds of Formula I wherein COR is acetyl are prepared by heating a compound of Formula II, having the prerequisite additional unsaturation, with isopropenyl acetate in the presence of a strong acid catalyst.

The compounds of Formula I wherein COR is higher than acetyl are prepared by a new process which comprises heating a compound of Formula II, having the prerequisite additional unsaturation, with a compound of the formula R—CO—X, wherein R—CO is lower-carboxylic acyl having from three to twelve carbon atoms and X is chlorine or bromine, in isopropenyl acetate solution and in the presence of a strong acid catalyst. The reaction mixture is heated at a temperature between about 50° C. and 150° C., conveniently at the boiling point (89° C.) of the isopropenyl acetate. The strong acid catalyst can be any strong inorganic or organic acid, for example, sulfuric acid, perchloric acid, p-toluenesulfonic acid, sulfosalicylic acid, and the like.

Compounds of Formula II having a double bond at the 15,16-position can also be used as starting materials. During enol-esterification the 15,16 double bond shifts to the 14,15-position.

This new process is not limited to the preparation of compounds of Formula I but can be adapted to the preparation of enol esters higher than the acetate from any oxo steroid wherein the oxo group is sufficiently reactive to form enol esters. Especially appropriate starting materials are 3-oxo steroids, 17-oxo steroids and 20-oxo steroids.

In the event that compounds of Formula II where R" is hydrogen are used as starting materials, the enol esterification reaction also esterifies the phenolic hydroxyl group leading to compounds of Formula I where R' is lower-carboxylic acyl.

The compounds of the invention having a double bond in the 14,15-position can be alternatively prepared by dehydrogenating an enol ester of Formula I saturated in the 14,15-position by heating it with 2,3-dichloro-5,6-dicyanobenzoquinone.

The structures of the compounds of the invention were established by the modes of preparation, by elementary analyses, and by their chemical and physical properties, including their ultraviolet, infrared and NMR spectra, and their behavior in thin-layer chromatography.

Biological evaluation of the compounds of the invention has shown that they possess hypocholesteremic and estrogenic activities.

The following examples will further illustrate the invention without the latter being limited thereby.

Example 1.—dl-17-acetoxy-3-methoxy-1,3,5(10),6,8,16-estrahexaene

A mixture of 4.00 g. of dl-equilenin methyl ether (M.P. 185–190° C.), 0.45 g. of p-toluenesulfonic acid and 80 ml. of isopropenyl acetate was heated slowly to boiling and distilled slowly over a period of seven hours. The mixture was then kept overnight at room temperature and distilled for seven hours longer. The reaction mixture was cooled, and after ether was added it was washed with 5% sodium bicarbonate solution and water, and concentrated in vacuo. The residue was recrystallized first from ether and then from ethyl acetate to give 1.90 g. of dl-17-acetoxy-3-methoxy-1,3,5(10),6,8,16-estrahexaene in the form of pale peach needles, M.P. 165.2–166.6° C. (corr.). An additional 0.99 g. of material was obtained by chromatography of the mother liquors on Florisil and elution with cyclohexane; ultraviolet maxima at 231 m$\mu$ ($\epsilon$=63,400), 258 (3,640), 268 (4,750), 278 (5,260), 290 (3,700), 323 (2,260), 338 (2,800), 311 (1,200) and 333 (2,220); infrared absorption at 3.31, 3.44, 3.55 and 5.69$\mu$.

dl-17-acetoxy-3-methoxy-1,3,5(10),6,8,16-estrahexaene was found to be about equal to triparanol in lowering serum cholesterol when administered orally to rats. The compound was found to be about 3% as active as estrone as an estrogen when administered orally to rats.

By replacing the dl-equilenin methyl ether in the foregoing preparation by a molar equivalent amount of 8,9-dehydroestrone there can be obtained dl-17-acetoxy-3-methoxy-1,3,5(10),8,16-estrapentaene.

Example 2

17 - acetoxy - 3 - methoxy-1,3,5(10),6,16-estrapentaene was prepared from 4.0 g. of 6-dehydroestrone methyl ether, 200 ml. of isopropenyl acetate and 0.20 g. of sulfosalicylic acid according to the procedure described above in Example 1. The product was chromatographed and recrystallized from ether and from ethyl acetate to give 17-acetoxy-3-methoxy-1,3,5(10),6,16-esterapentaene in the form of colorless rods, M.P. 132.6–133.5° C. (corr.), $[\alpha]_D^2$=—160.4° (1% in chloroform); ultraviolet maxima at 221 m$\mu$ ($\epsilon$=30,400), 261 (7,350), 269 (6,000), 302 (2,500) and 310 (2,050); infrared absorption at 3.25, 3.30, 3.35, 3.40, 3.49, 5.67, 6.13, 6.22, 6.36, 6.68, 6.85 and 6.97$\mu$.

Example 3.—dl-17-benzoyloxy-3-methoxy-1,3,5(10),6,8,16-estrahexaene dl-Equilenin methyl ether (6.00 g.) was dissolved in 220 ml. of isopropenyl acetate. Sulfosalicylic acid (0.20 g.) was then added followed by 10 ml. of benzoyl chloride. The reaction mixture was refluxed and distilled slowly for six hours, then left overnight at room temperature and refluxed and distilled slowly for nine hours longer. After several days at room temperature, 2.4 ml. of benzoyl chloride was added and the mixture was refluxed and distilled slowly for seven hours after which the final volume was 60 ml. The product was chromatographed on 250 g. of Florisil (activated magnesium silicate) and eluted pentane to give a mixture of enol acetate and enol benzoate. The latter mixture was rechromatographed on Florisil and eluted with pentane followed by pentane containing 1–2% ether. Pentane-ether (49:1) brought out 2.59 g. of dl-17-benzoyloxy-3-methoxy-1,3,5(10),6,8,16-estrahexaene, colorless needles, M.P. 120.2–121.8° C. (corr.) when recrystallized from ether; ultraviolet maxima at 231 m$\mu$ ($\epsilon$=74,100), 256 (9,435), 268 (2,570), 279 (8,670), 289 (5,160), 310 (1,280), 323 (2,130), 333 (2,000) and 338 (2,610); infrared absorption at 3.45, 3.55, 5.67, 6.20, 6.26, 6.71, 6.89 and 8.04$\mu$.

By replacing the benzoyl chloride in the foregoing preparation by a molar equivalent amount of caproyl chloride, $\beta$-cyclohexylpropionyl chloride, p-nitrobenzoyl chloride, $\beta$-phenylpropionyl chloride, cinnamoyl chloride, p-chlorophenoxyacetyl chloride or nicotinoyl chloride there can be obtained, respectively, dl-17-caproyloxy-3-methoxy - 1,3,5(10),6,8,16 - estrahexaene, dl-17-($\beta$-cyclohexylpropionyloxy) - 2 - methoxy-1,3,5(10),6,8,16-estrahexaene, dl-17-(p-nitrobenzoyloxy)-3-methoxy-1,3,5(10), 6,8,16 - estrahexaene, dl - 17 - ($\beta$ - phenylpropionyloxy)-3-methoxy-1,3,5(10),6,8,16-estrahexaene, dl-17-cinnamoyloxy - 3-methoxy-1,3,5(10),6,8,16-estrahexaene, dl-17-(p-chlorophenoxyacetoxy) - 3 - methoxy - 1,3,5(10),6,8,16-estrahexaene or dl-17-nicotinoyloxy-3-methoxy-1,3,5(10), 6,8,16-estrahexaene.

By replacing the dl-equilenin methyl ether in the foregoing preparation by a molar equivalent amount of equilenin there can be obtained 3,17-dibenzoyloxy-1,3,5(10),6,8,16-estrahexaene.

By replacing the dl-equilenin methyl ether in the foregoing preparation by a molar equivalent amount of equilenin n-hexyl ether there can be obtained 17-benzoyloxy-3-(n-hexyloxy)-1,3,5(10),6,8,16-estrahexaene.

By replacing the dl-equilenin methyl ether in the foregoing preparation by a molar equivalent amount of androstan - 17$\beta$ - ol - 3 - one, androstan - 3$\beta$-ol-17-one or 5-pregnen-3$\beta$-ol-20-one there can be obtained, respectively, the enol benzoate of 17$\beta$-benzoyloxyandrostan-3-one, the enol benzoate of 3$\beta$-benzoyloxyandrostan-17-one, or the enol benzoate of 3$\beta$-benzoyloxy-5-pregnen-20-one.

Example 4.—3-methoxy-17-valeryloxy-1,3,5(10), 16-estratetraene

Estrone methyl ether (10.0 g.) was dissolved in 400 ml. of warm isopropenyl acetate, 200 mg. of sulfosalicylic acid added, and the solution refluxed and distilled slowly for one hour. Valeryl chloride (21.2 g.) was then added and the distillation was continued for eight hours, 200 ml. of distillate being collected. The reaction mixture was concentrated in vacuo, the residue dissolved in 160 ml. of hot cyclohexane and chromatographed on 200 g. of Florisil. The column was eluted with pentane-cyclohexane and pentane and the material thus eluted was rechromatographed on 600 g. of Florisil. The column was eluted with pentane and with pentane-ether (199:1) and the product recrystallized twice from ethyl acetate to give 3-methoxy-17-valeryloxy-1,3,5(10),16-estratetraene, M.P. 47–55° C. (uncorr.).

Example 5

17-benzoyloxy-3-methoxy-1,3,5(10),6,16-estrapentaene was prepared from 8.00 g. of 6-dehydroestrone methyl ether, 200 ml. of isopropenyl acetate, 12 ml. of benzoyl chloride and 350 mg. of sulfosalicylic acid according to the procedure described above in Example 3. The product was chromatographed and recrystallized from ethyl acetate to give 17-benzoyloxy-3-methoxy-1,3,5(10),6,16-estrapentaene in the form of colorless plates, M.P. 128.5–129.5° C. (corr.), $[\alpha]_D^{25}$=—143.2° (1% in chloroform); ultraviolet maxima at 227 m$\mu$ ($\epsilon$=38,000), 261 (12,050), 270 (10,100), 300 (3,000) and 309 (2,400); infrared absorption at 3.42, 5.75, 6.19, 6.25, 6.37, 6.70, 6.87, 7.95 and 8.02$\mu$.

Example 6.—dl-17-acetoxy-3-methoxy-1,3,5(10),6,8, 14,16-estraheptaene

A mixture of 8.91 g. of dl-17-acetoxy-3-methoxy-1,3,5 (10),6,8,16-estrahexaene, 6.70 g. of 2,3-dichloro-5,6-dicyanobenzoquinone and 300 ml. of benzene was stirred and refluxed under nitrogen for two hours. The reaction mixture was cooled to room temperature and filtered, and the filtrate was concentrated in vacuo to a small volume and chromatographed on 300 g. of Florisil. The column was eluted with pentane containing increasing amounts of benzene and then with benzene alone. The product was recrystallized from a benzene-methanol mixture to give dl-17 - acetoxy - 3 - methoxy - 1,3,5(10),6,8,14,16 - estraheptaene in the form of pale pink crystals, M.P. 145.6–146.4° C. (corr.); ultraviolet maxima at 232 mμ (ε=35,400), 278 (15,300), 287 (16,500) and 333 (23,300); infrared absorption at 3.31, 3.46, 5.69, 6.20, 6.29, 6.34, 6.51, 6.65, 6.78, 6.85, 7.00 and 8.35–8.40μ.

Example 7.—17-acetoxy-3-methoxy-1,3,5(10), 14,16-estrapentaene

A mixture of 4.00 g. of 3-methoxy-1,3,5(10),15-estratetraen-17-one, 150 ml. of isopropenyl acetate and 0.800 g. of p-toluenesulfonic acid was refluxed with distillation for eight hours. The solution was concentrated until crystals separated. The crystals were collected by filtration and refluxed first from cyclohexane and then from a benzenehexane mixture to give 17-acetoxy-3-methoxy-1,3,5(10), 14,16-estrapentaene in the form of colorless needles, M.P. 128.6–135.0° C. (corr.).

We claim:
1. A compound of the formula

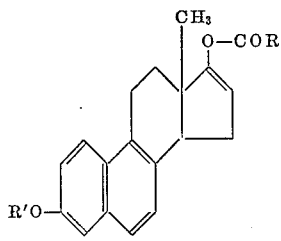

wherein —COR is lower-carboxylic acyl having up to twelve carbon atoms, and R′ is lower-alkyl.

2. 17 - acetoxy - 3 - methoxy - 1,3,5(10),6,8,16 - estrahexaene.

3. 17 - benzoyloxy - 3 - methoxy-1,3,5(10),6,8,16-estrahexaene.

4. A compound of the formula

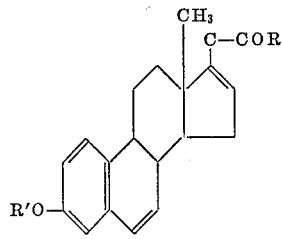

wherein —COR is lower-carboxylic acyl having up to twelve carbon atoms, and R′ is lower-alkyl.

5. 17 - acetoxy - 3 - methoxy - 1,3,5(10),6,16 - estrapentaene.

6. 17 - benzoyloxy - 3 - methoxy - 1,3,5(10),6,16-estrapentaene.

7. A compound of the formula

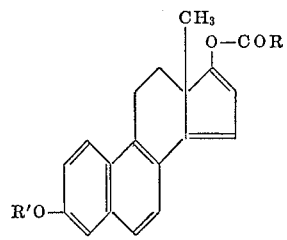

wherein —COR is lower-carboxylic acyl having up to twelve carbon atoms, and R′ is lower-alkyl.

8. 17 - acetoxy - 3 - methoxy - 1,3,5(10),6,8,14,16-estraheptaene.

9. A compound of the formula

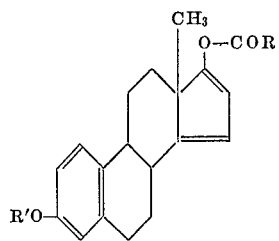

wherein —COR is lower-carboxylic acyl having up to twelve carbon atoms, and R′ is lower-alkyl.

10. 17-acetoxy - 3 - methoxy - 1,3,5(10),14,16 - estrapentane.

11. The process for preparing enol esters of 3-oxo steroids, 17-oxo steroids or 20-oxo steroids, which comprises heating a said oxo steroid with a compound of the formula R—CO—X, wherein R—CO is lower-carboxylic acyl having from three to twelve carbon atoms and X is chlorine or bromine, in isopropenyl acetate solution and in the presence of a strong acid catalyst.

12. The process for preparing a compound of the formula

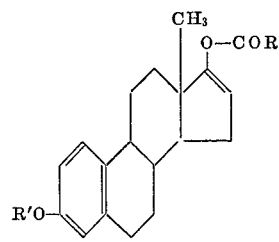

having from one to three additional double bonds in positions selected from the 6,7-, 8,9- and 14,15-positions; wherein —COR is lower-carboxylic acyl having from three to twelve carbon atoms, and R′ is lower-alkyl or lower-carboxylic acyl having from three to twelve carbon atoms, which comprises heating a compound of the formula

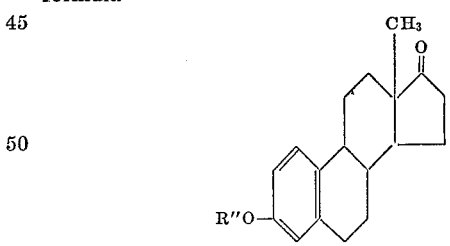

having from one to three additional double bonds in positions selected from the 6,7-, 8,9- and 14,15-positions, and wherein R″ is hydrogen or lower-alkyl, with a compound of the formula R—CO—X, wherein R—CO has the meaning given hereinabove and X is chlorine or bromine, in isopropenyl acetate solution and in the presence of a strong acid catalyst.

13. The process for preparing a compound of the formula

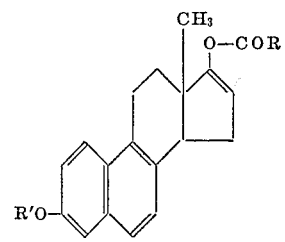

wherein —COR is lower-carboxylic acyl having from three to twelve carbon atoms, and R' is lower-alkyl, which comprises heating a compound of the formula

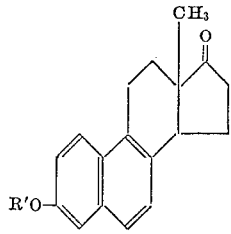

wherein R' is lower-alkyl, with a compound of the formula R—CO—Cl, wherein R—CO has the meaning given hereinabove, in isopropenyl acetate solution and in the presence of a strong acid catalyst.

14. The process for preparing a compound of the formula

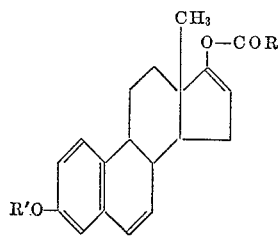

wherein —COR is lower-carboxylic acyl having from three to twelve carbon atoms, and R' is lower-alkyl, which comprises heating a compound of the formula

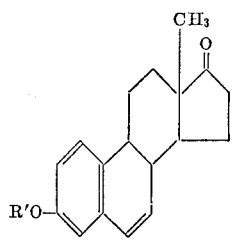

wherein R' is lower-alkyl, with a compound of the formula R—CO—Cl, wherein R—CO has the meaning given hereinabove, in isopropenyl acetate solution and in the presence of a strong acid catalyst.

References Cited
UNITED STATES PATENTS 2,889,342  6/1959  Loken _____ 260—397.4
3,189,605  6/1965  Smith et al. _____ 260—239.55

LEWIS GOTTS, *Primary Examiner.*

E. G. LOVE, *Assistant Examiner.*

UNITED STATES PATENT OFFICE
CERTIFICATE OF CORRECTION

Patent No. 3,379,743                            April 23, 1968

Andrew John Manson et al.

It is hereby certified that error appears in the above numbered patent requiring correction and that the said Letters Patent should read as corrected below.

Column 4, line 8, "-2-methoxy-" should read -- -3-methoxy- --. Column 5, lines 43 to 50, the upper portion of the formula should appear as shown below:

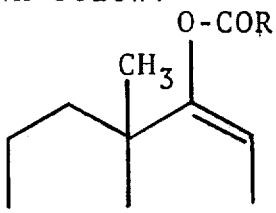

Column 6, lines 16 and 17, "estrapentane" should read -- estrapentaene --.

Signed and sealed this 16th day of September 1969.

(SEAL)
Attest:

EDWARD M. FLETCHER, JR.                  WILLIAM E. SCHUYLER, JR.
Attesting Officer                             Commissioner of Patents